(12) United States Patent
Warrior et al.

(10) Patent No.: US 7,242,294 B2
(45) Date of Patent: Jul. 10, 2007

(54) SYSTEM AND METHOD FOR USING MOBILE COLLECTORS FOR ACCESSING A WIRELESS SENSOR NETWORK

(75) Inventors: Jogesh Warrior, Mountain View, CA (US); John C. Eidson, Palo Alto, CA (US); Jeff Burch, Palo Alto, CA (US); Jerry Liu, Sunnyvale, CA (US)

(73) Assignee: Agilent Technologies, Inc, Santa Clara, CA (US)

( * ) Notice: Subject to any disclaimer, the term of this patent is extended or adjusted under 35 U.S.C. 154(b) by 670 days.

(21) Appl. No.: 10/664,400

(22) Filed: Sep. 17, 2003

(65) Prior Publication Data

US 2005/0057370 A1    Mar. 17, 2005

(51) Int. Cl.
 *G08B 1/08* (2006.01)
(52) U.S. Cl. .............. 340/539.22; 340/539.11; 340/870.1
(58) Field of Classification Search ........... 340/539.22, 340/539.11, 539.17, 10.33, 870.1; 455/500, 455/115.1, 11.1
See application file for complete search history.

(56) References Cited

U.S. PATENT DOCUMENTS

| 6,844,814 B2* | 1/2005 | Chin et al. ............. 340/539.22 |
| 2003/0202479 A1* | 10/2003 | Huang et al. ............... 370/252 |
| 2005/0207376 A1* | 9/2005 | Ashwood-Smith et al. . 370/338 |
| 2006/0017809 A1* | 1/2006 | Carroll ........................ 348/158 |

FOREIGN PATENT DOCUMENTS

EP    0 420 295    4/1991

OTHER PUBLICATIONS

A. Wadaa, S. Olariu, L. Wilson, K. Jones, Q. Xu—ODU Sensor Network Research Group, Dept. Of Computer Science, Old Dominion University, Norfolk, VA 23529-0162; "On Taining A Sensor Network", Proceedings of the International Parallel And Distributed Processing Symposium, 2003; pp. 220-227.

Peter Scholander, Glenn Frank and Andreas Yankopolus—Scientific Research Corporation, Atlanta, Georgia; Robert Marzen, U.S. Army CECOM, Fort Monmouth, New Jersey—"Energy-Efficient Networking Techniques For Wireless Sensor Networks". 2003 IEEE Military Communications Conference; pp. 573-578.

(Continued)

*Primary Examiner*—Toan N. Pham

(57) ABSTRACT

A system and method are provided that use mobile collectors for accessing a wireless sensor network. In certain embodiments, one or more mobile collectors having mobility that is unpredictable to a wireless sensor network are deployed for use in accessing the wireless sensor network. Thus, rather than relying on an access technique having certainty designed therein with regard to the access of a wireless sensor network, certain embodiments utilize an access technique that relies on statistical probability for accessing the wireless sensor network. For instance, by deploying a plurality of mobile collectors that are operable for accessing a wireless sensor network, a statistical probability exists that at some point (or at various points in time) at least one of the mobile collectors will travel within range of the wireless sensor network to enable access thereof.

47 Claims, 3 Drawing Sheets

OTHER PUBLICATIONS

I. F. Akyildiz, W. Su, Y. Sankarasubramaniam, E. Cayirci—Broadband and Wireless Networking Laboratory, School of Electrical and Computer Engineering, Georgia Institute of Technology, Altlanta, GA; "Wireless Sensor Networks: A Survey"; Computer Networks 38 (2002); Elsevier Science Publishers B.V., Amsterdam, NL; vol. 38, No. 4; pp. 393-422.

European Search Report dated Jun. 17, 2005.

U.S. Appl. No. 10/306,940, filed Nov. 27, 2002, Jeff Burch et al.

Bulusu, Nirupama et al., "Self-Configuring Localization Systems: Design and Experimental Evaluation", Submitted to ACM TECS Special Issue on Networked Embedded Computing, Aug. 2002, pp. 1-34.

Bulusu, Nirupama et al., "Scalable, Ad Hoc Deployable RF-based Localization", Computer Science Department, UCLA, no date, 5 pages.

Chakrabarti, Arnab et al., "Using Predictable Observer Mobility for Power Efficient Design of Sensor Networks", IPSN 2003, LNCS 2634, pp. 129-145.

Elson, Jeremy et al., "Wireless Sensor Networks: A New Regime for Time Synchronization", Proceedings of the First Workshop on Hot Topics in Networks, Oct. 2002, 6 pages.

Ganesan, Deepak et al., "DIMENSIONS: Why do we need a new Data Handling architecture for Sensor Networks?", Dept. of Computer Science, UCLA, 2002, 6 pages.

Ganesan, Deepak et al., Complex Behavior at Scale: An Experimental Study of Low-Power Wireless Sensor Networks, no cite, no date, 11 pages.

Girod, Lewis et al., "Locating tiny sensors in time and space: A case study", Dept. of Computer Science, UCLA, no date, 6 pages.

Greenstein, Benjamin et al., "DIFS: A Distributed Index for Features in Sensor Networks", no cite, no date, 12 pages.

Kumar, P. R., "Architecture and algorithms in ad hoc wireless networks", Univ. of Illinois, 2001, 24 pages.

Madden, Samuel et al., "TAG: a Tiny AGgregation Service for Ad-Hoc Sensor Networks", 5th Annual Symposium on Operating Systems Design and Implementation, Dec. 2002, 16 pages.

* cited by examiner

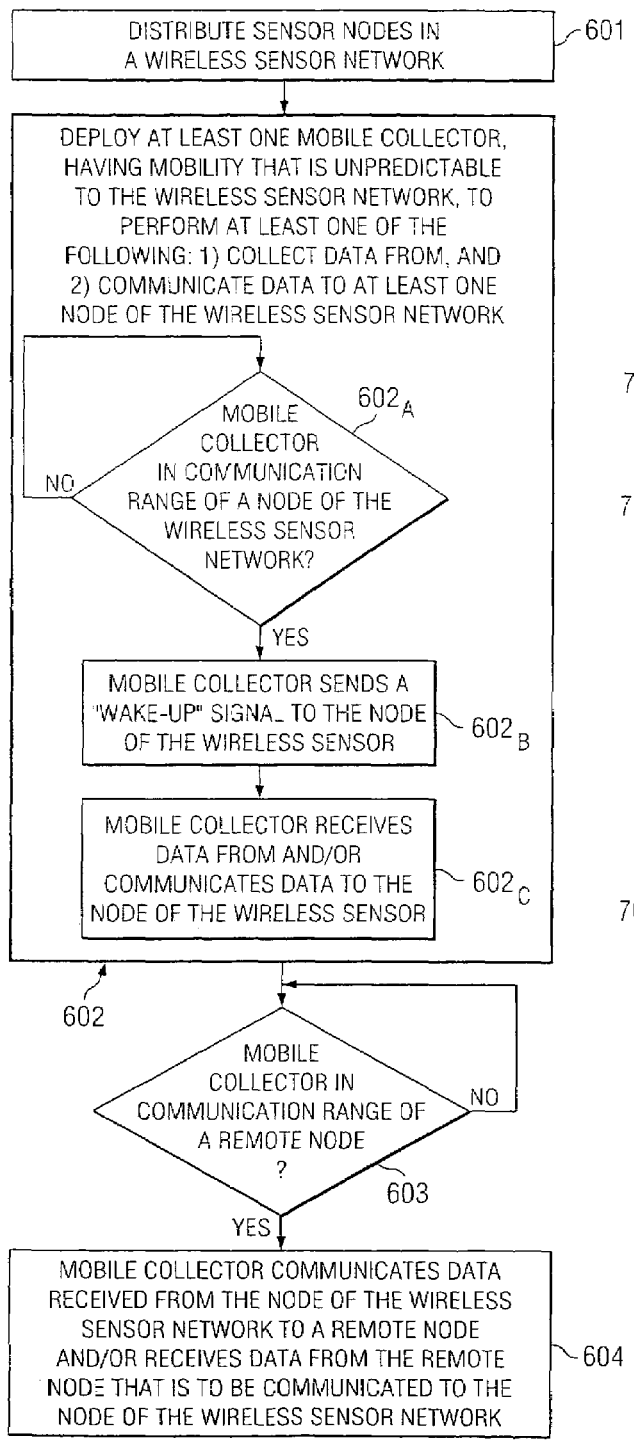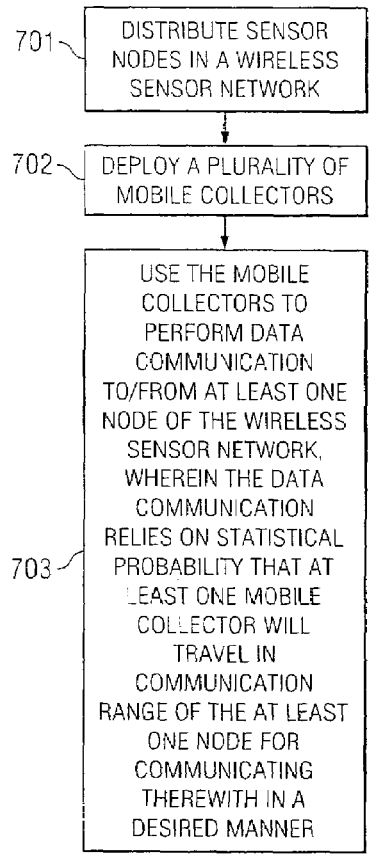

SYSTEM AND METHOD FOR USING MOBILE COLLECTORS FOR ACCESSING A WIRELESS SENSOR NETWORK

TECHNICAL FIELD

The present invention relates in general to accessing wireless sensor networks, and more particularly to systems and methods using mobile collectors for accessing wireless sensor networks.

BACKGROUND OF THE INVENTION

Recently, there has been considerable interest in non-traditional measurement systems, such as wireless sensor networks. Wireless sensor networks generally comprise a plurality of sensor nodes that are each operable to perform some measurement and communicate wirelessly. Sensor nodes are commonly equipped, for example, with sensor(s) (or "measurement devices"), local storage, a processor (e.g., a central processing unit (CPU)), and wireless (e.g., radio) communication facilities. Such sensor nodes are typically small (e.g., include micro-sensors), and typically have short-range wireless communication capability.

Generally, the sensor nodes have one or more of the following characteristics: a) the nodes are desired to operate for extended periods of time on battery power; b) the nodes have limited computation, memory, and communication capability often due to power constraints; c) the nodes typically communicate using short-range wireless communication; d) the nodes are commonly installed in remote or other environments that preclude normal communication and control of the devices; and e) the nodes are often inexpensive. Sensor nodes are generally expected to be long-lived (deployed for years), untethered (both in terms of communication and power), and unattended (and so are capable of self-configuring and self-adapting). Wireless sensor networks often comprise a large number of sensor nodes that are deployed within a physical environment of interest, and such sensor nodes may measure aspects of the physical environment in great detail.

Sensor nodes may be deployed in a wireless sensor network in different ways. In one technique, ad-hoc deployment (e.g., random scattering) may be used, wherein sensor nodes are dropped with no particular plan or pre-defined arrangement. For example, initial deployment may involve dropping sensor nodes from an aircraft into an area of interest at random. The resulting wireless sensor network is referred to as an "ad-hoc" network (and is also sometimes referred to by other terms, such as "scatter nets" or "pico nets"). After being deployed in this ad-hoc manner, the sensor nodes interact with each other to establish a communication network among themselves. In another deployment technique, sensor nodes are specifically placed in desired locations, wherein the sensors may be precisely positioned relative to one another.

While individual sensor nodes may have limited functionality, the global behavior of the wireless sensor network can be quite complex. Thus, the functionality of the whole may be greater than the sum of its parts. This may be achieved, in part, through data fusion (i.e., the process of transforming and merging individual sensor readings into a high-level sensing result). That is, sensor nodes may both sense/measure a characteristic of their local environment and communicate locally with other local sensor nodes to construct semantically rich conclusions about that local environment.

Sensor nodes may have the capability of measuring at least one characteristic in their environment, such as detecting ambient conditions (e.g., temperature, humidity, movement, sound, light, or the presence or absence of certain objects). Many potential applications of wireless sensor networks exist, including as examples physiological monitoring, environmental monitoring (e.g., monitoring air, water, soil, chemistry, etc.), condition-based maintenance, military surveillance, precision agriculture, geophysical monitoring, transportation, monitoring of business processes (e.g., factory instrumentation and inventory tracking), animal monitoring (e.g., detecting the presence of animals), habitat monitoring, and/or measuring various other types of events.

Typically, the primary resource constraint of nodes in sensor networks is energy. Because many sensor networks deploy sensor nodes that are battery powered and that can scavenge only a small amount of energy from their surroundings, limited battery power is one of the major hurdles in achieving desired longevity of network operation. Reducing power consumption in sensing and subsequent data collection has been a topic of extensive study. The primary energy consumer in most wireless network sensors is the wireless (e.g., radio) transmissions.

Wireless sensor networks may collect a tremendous amount of detailed measurement (or sensed) data about their local environment. Such data may be communicated to an application that is located remote from the wireless sensor network. In some cases, a local high-powered (or long-range) communication device (or "data collector") may be used to collect data from the sensors and relay that data to the application and/or to provide information from the application to the sensors.

BRIEF SUMMARY OF THE INVENTION

The present invention is directed to a system and method which use mobile collectors for accessing a wireless sensor network. In certain embodiments, one or more mobile collectors having mobility that is unpredictable to a wireless sensor network are deployed for use in accessing the wireless sensor network. For instance, the travel route and/or schedule of such a mobile collector may be unpredictable to the wireless sensor network. Thus, rather than relying on an access technique having certainty designed therein with regard to the access of a wireless sensor network, certain embodiments of the present invention utilize an access technique that relies on statistical probability for accessing the wireless sensor network. For instance, by deploying a plurality of mobile collectors that are operable for accessing a wireless sensor network, a statistical probability exists that at some point (or at various points in time) at least one of the mobile collectors will travel within range of the wireless sensor network to enable access thereof (e.g., to enable the mobile collector to collect data from the wireless sensor network and/or to enable the mobile collector to communicate data to the wireless sensor network). In certain implementations, general-purpose mobile communication devices, such as cellular telephones, are adapted for use as mobile collectors for accessing wireless sensor networks.

Certain embodiments enable more flexible deployment of sensor networks by radically reducing the demands on power and long distance communication within a sensor network. Certain implementations make use of randomly mobile collection devices to access the sensor network and bi-directionally communicate information between the sensor network and application servers over potentially random, transient communication links.

In accordance with at least one embodiment, a method comprises using at least one mobile data collector, having mobility that is unpredictable to a wireless sensor network, for performing at least one of data collection from and data communication to at least one sensor in the wireless sensor network.

In accordance with at least one embodiment, a method comprises deploying a plurality of mobile collectors that are each operable to communicatively access a node of a wireless sensor network and that are each independently movable. The method further comprises employing an application that desires communication access with at least one node of the wireless sensor network, wherein the application relies on statistical probability that at least one of the plurality of mobile collectors will travel in communication range of the at least one node of the wireless sensor network for performing the desired communication.

Further, according to at least one embodiment a system comprises a wireless sensor network having a plurality of nodes. At least one of the plurality of nodes comprises a) an interface for communicating via wireless communication with other nodes of the wireless sensor network and b) an interface for communicating via a transient communication link with a mobile collector. The system further comprises at least one mobile collector comprising a first interface having a first range of communication for communicating with a node in the wireless sensor network. The at least one mobile collector further comprises a second interface for communicating with a node external to the wireless sensor network wherein the second interface is operable for communicating a range longer than the first range. The node external to the wireless sensor network relies on the at least one mobile collector for accessing the wireless sensor network for performing at least one of a) collecting data from the wireless sensor network and b) communicating data to the wireless sensor network. Further, an access pattern of the at least one mobile collector accessing of the wireless sensor network is not predefined.

Also, according to at least one embodiment a system comprises a wireless sensor network comprising a plurality of means for measuring a characteristic of an environment and communicating via short range wireless communication. The system further comprises a plurality of means for accessing at least one of the measuring means for performing a desired communication therewith, wherein the plurality of access means are independently movable and are capable of travelling outside communication range of the wireless sensor network, and wherein a statistical probability exists that at least one of the accessing means will travel within range of the at least one of the measuring means to enable the accessing means to perform the desired communication with the at least one of the measuring means.

Further, according to at least one embodiment, a method comprises using at least one mobile data collector for performing at least one of data collection from and data communication to at least one node of a wireless sensor network. The at least one mobile data collector determines if it is in range for transient communication with the at least one node. If determined that it is in range for transient communication, the at least one mobile data collector communicates a wake-up signal to the at least one node to cause it to increase its power to a level suitable for communication.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 6 shows an operational flow of one example embodiment of the present invention; and FIG. 7 shows an operational flow of another example embodiment of the present invention.

DETAILED DESCRIPTION OF THE INVENTION

To more fully appreciate aspects of certain embodiments of the present invention, a brief discussion of techniques proposed in the prior art for collecting measurement data from wireless sensor networks is appropriate. Wireless sensor networks are usually implemented as a collection of small sensor devices (or "nodes") communicating over low-power wireless links and powered by a battery. As mentioned above, the nodes of a wireless sensor network may be distributed in an ad-hoc manner. In such ad-hoc sensor networks, the communication between the sensor nodes is typically established via protocols that self-configure the ad-hoc network, as opposed to the designed communication topology of traditional networked measurement systems. Because these sensor nodes generally run on battery power and are expected to last for several years, severe constraints are typically placed on the amount of computation, and particularly on the amount and range of communication of the sensor nodes. As a result, various communication algorithms and operational parameters geared toward limiting battery drain have been proposed.

Wireless sensor networks are often installed in remote or other environments where access to traditional networks and power are not available. These wireless networks are usually designed to gather the measurement data at one or more points in the wireless network where special devices (which may be referred to as "edge" or "collector" nodes) are needed to collect the measurement data from the sensor nodes and communicate such data to a remote node (which may be accessible by an end user or application). Typically, a higher-powered radio or other device is included at 'the edge' to communicate to conventional networks to provide connection to central servers. This is a distinct disadvantage in many applications. For example, the location of the sensor network may be one in which having a high-powered radio or other long-range communication device is inconvenient or impractical—e.g., it may be in a location in which the appropriate infrastructure for such long-range communication does not exist. As another example communication demands on edge nodes and the nodes on the paths leading to it typically cause them to suffer excessive power drain, which may necessitate additional protocols and overhead to average the power drain by reconfiguring network topology to make use of alternate long-range communication devices. Additionally, nodes with long distance radios are more expensive.

Figure 1:
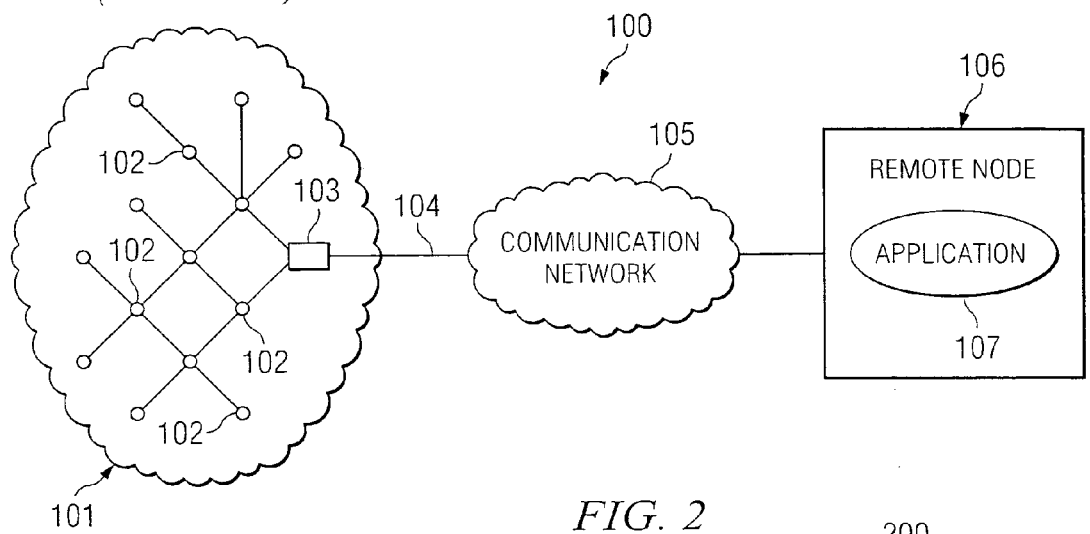
FIG. 1 shows an example implementation of a traditional wireless sensor network.

Turning to FIG. 1, an example implementation of a traditional wireless sensor network is shown. More specifically, a system 100 is shown that includes wireless sensor network 101, which comprises a plurality of sensor nodes 102 that are arranged therein (either through specific placement or through ad-hoc distribution). Sensor nodes 102 are capable of communicating with each other via short-range wireless communication. For example, each sensor node may be capable of wirelessly communicating with another local sensor node (i.e., another sensor node within the wireless sensor network 101) that is nearby (e.g., no more than 30 feet away for certain types of short-range wireless communication). Further, many of such nodes 102 may be distributed throughout a large (e.g., 10 square-mile) region, and the sensor nodes form a communication network among themselves across such region.

Wireless sensor network 101 also includes a stationary, positionally-fixed collector (or "edge") node 103 that collects measurement data from the sensor nodes 102 and communicates such measurement data to a remote node 106. One or more of such collector nodes 103 may be included in wireless sensor network 101, and collector node(s) 103 typically interact with sensor nodes 102 to become a collector node within the wireless sensor network. Collector node 103 typically comprises a higher-powered radio or other long-range communication device to communicate collected measurement data via conventional communication network 105 to a node 106 that is remotely located from wireless sensor network 101. A user and/or application, such as application 107, may use the measurement data at remote node 106. Communication demands on collector node 103 and sensor nodes 102 on the paths leading to it typically cause them to suffer excessive power drain. This necessitates additional protocols and overhead to average the power drain by reconfiguring network topology to make use of alternate long-range communication devices. Additionally, collector nodes 103 with long distance radios are more expensive.

Figure 2:
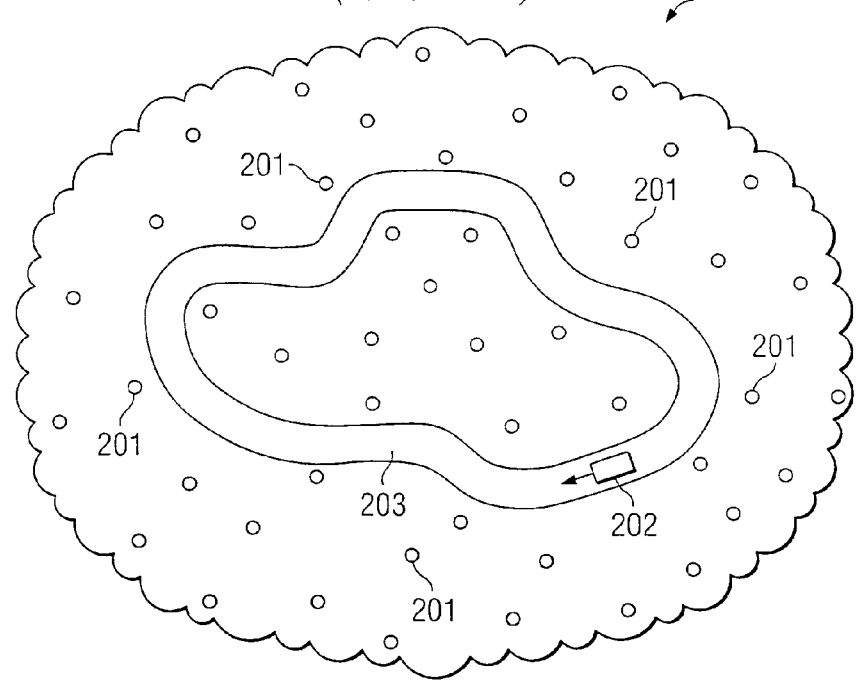
FIG. 2 shows another technique proposed in the prior art for collecting measurement data from a wireless sensor network.

Another technique proposed for collecting measurement data from a wireless sensor network is described by Chakrabarti, et al. in "Using Predictable Observer Mobility for Power Efficient Design of Sensor Networks", F. Zhao and L. Guibas (Eds.): IPSN 2003, LNCS 2634, pp. 129-145, 2003. This technique is briefly described herein with reference to FIG. 2. FIG. 2 shows a wireless sensor network 200, which comprises a plurality of sensor nodes 201 that are arranged therein. As with the example sensor nodes 102 of FIG. 1, sensor nodes 201 are capable of communicating with each other via short-range wireless communication. A mobile collector 202 having predictable mobility about route 203 is used to collect measurement data from the sensor nodes 201. That is, mobile collector 202 has predictable mobility in that it is known to travel route 203 according to a defined schedule. Thus, both its travel route and its travel schedule are predictable. For instance, sensor nodes 201 may be distributed about a University's campus, and a campus bus may include a collector node thereon such that the collector node has predictable mobility (according to the bus route/schedule).

Embodiments of the present invention also use a mobile collector for accessing a wireless sensor network. More particularly and in contrast to the above-described proposed technique of FIG. 2, in certain embodiments one or more mobile collectors having mobility that is unpredictable to a wireless sensor network are deployed for use in accessing the wireless sensor network. For instance, the travel route and/or schedule of such a mobile collector may be unpredictable to the wireless sensor network. In the above example techniques of FIGS. 1 and 2 for accessing a wireless sensor network, spatial and temporal certainty regarding the collection of data from the wireless sensor network is designed into the collection techniques. For instance, the data collector is fixed within the wireless sensor network in the technique of FIG. 1, wherein the data collector is available for data collection as desired. In the event that the sensor network is re-configured to average power drain, the re-configuration must ensure that resulting network paths are on the fixed path of the mobile collector, thus limiting the ability to carry out power averaging. In the example technique of FIG. 2, a mobile collector having predictable mobility with regard to the wireless sensor network is used, wherein the mobile collector's mobility is known to make the collector available for collection as desired (i.e., available at a specific place during a specific period of time).

Rather than relying on an access technique having spatial and temporal certainty designed therein with regard to the access of a wireless sensor network, certain embodiments of the present invention utilize an access technique that relies on statistical probability for accessing the wireless sensor network. For instance, by deploying a plurality of mobile collectors that are operable for accessing a wireless sensor network, a statistical probability exists that at some point (or at various points in time) at least one of the mobile collectors will travel within range of the wireless sensor network to enable access thereof (e.g., to enable the mobile collector to collect data from the wireless sensor network and/or to enable the mobile collector to communicate data to the wireless sensor network). Because spatial and temporal certainty is not designed into the access technique, embodiments described further below provide systems and methods for managing access to the wireless sensor network as desired for a given application.

Of course, the probability of access by a mobile collector may be influenced by intelligently selecting carriers of a mobile collector. For instance, suppose a wireless sensor network desired to be periodically accessed for collection of its measurement data for use by an application exists in a metropolis. Taxicab drivers in and around the metropolis may be supplied cellular telephones that are capable of not only placing telephone calls (the normal functionality of cellular telephones) but are also operable to interact with the wireless sensor network for collecting data therefrom (thereby acting as a mobile data collector). The taxicab drivers may, in some instances, be provided with some incentive to accept the cellular telephones, such as discounted rates, etc. Thus, the probability that such taxicab drivers will regularly come within range of the wireless sensor network of interest may be very high, but the access pattern of the wireless sensor network by the various taxicab drivers is not controlled or fixed (e.g., the pattern of when any one or more of the taxicab drivers travel within range of the wireless sensor network is not controlled or fixed).

In addition to or instead of the taxicab drivers, mail carriers in and around the metropolis in which the wireless sensor network of interest is located may also be provided such cellular telephones. The mail carriers may individually have a more defined route that they regularly follow than do taxicab drivers (e.g., each mail carrier may have an assigned mail route, which may change from time to time). However, the access pattern from the perspective of the wireless sensor network (or the application desiring measurement data from such wireless sensor network) that results from distribution of such cellular telephones to the mail carriers and/or taxicab drivers is uncontrolled.

Figure 3:
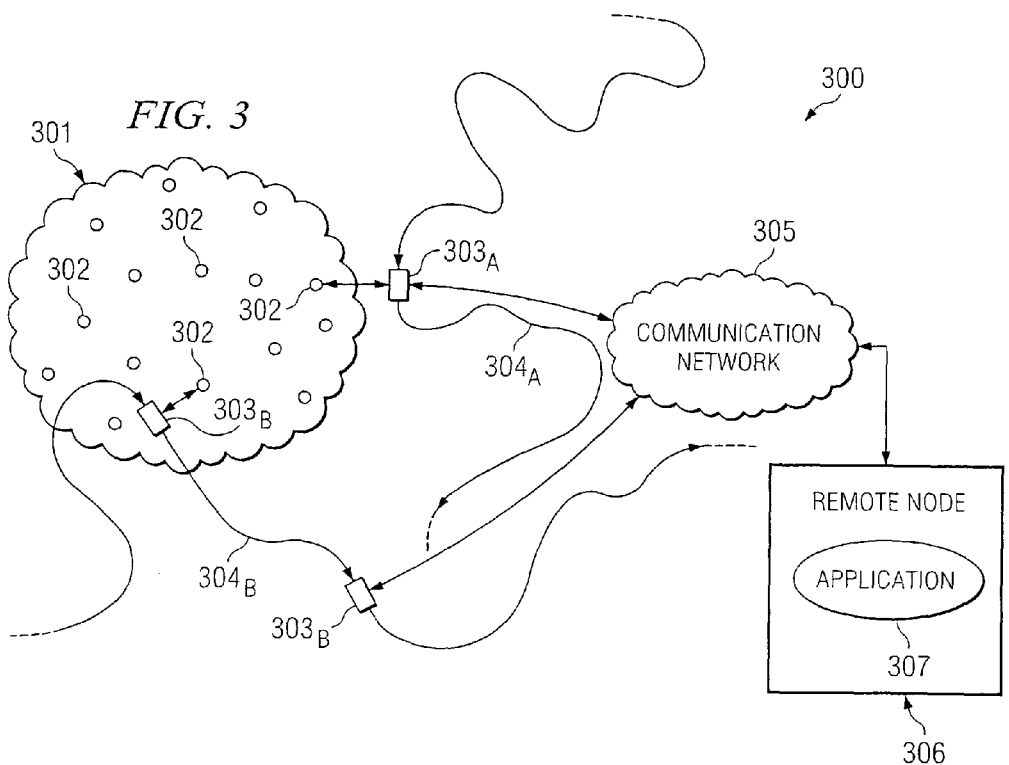
FIG. 3 shows an example representation of one embodiment of the present invention.

FIG. 3 shows an example representation of one embodiment of the present invention. As shown, system 300 includes wireless sensor network 301 having a plurality of sensor nodes (e.g., measurement probes) 302. As used herein, "sensor" is intended to encompass any node in a wireless sensor network 301, including without limitation nodes having operability to perform one or more of such tasks as sensing (or probing), actuation, computation, data storage, and forwarding data. Thus, sensor nodes 302 are not limited to nodes operable to perform sensing (or probing), but may include additional or alternative functionality within the wireless sensor network 301. Sensor nodes 302 may be distributed through wireless sensor network 301 in an ad-hoc manner (and thus wireless sensor network 301 may be an ad-hoc network) or sensor nodes 302 may be arranged through specific placement thereof. Further, in certain implementations, some or all of sensor nodes 302 may be mobile nodes that are not positionally fixed.

As mentioned above, embodiments of the present invention utilize a mobile collector node (such as nodes $303_A$ and $303_B$ of FIG. 3) having unpredictable mobility (e.g., mobility that is not controlled by or known to the wireless sensor network 301) for collecting measurement data from the sensor nodes 302 and/or communicating information to the sensor nodes 302. While many examples are described herein using a wireless (e.g., cellular) telephone for implementing such a mobile collector node, any other mobile device having communication capability may be implemented in a similar manner, including without limitation PDAs, automobiles, cameras, watercraft, aircraft, etc. Further, many examples are described herein as using a mobile collector node (such as nodes $303_A$ and $303_B$ of FIG. 3) that communicates via wireless communication with one or more nodes of a wireless sensor network. As used herein, such wireless communication is intended to encompass any type of wireless communication now known or later developed, including without limitation radio frequency (RF), infrared, ultrasonic, microwave, bar-code scanning, RFID, cable, and cellular. Further, while many examples are described herein as using a mobile collector node (such as nodes $303_A$ and $303_B$ of FIG. 3) that communicates via wireless communication with one or more nodes of a wireless sensor network, alternative embodiments may utilize other types of communication links, including physical coupling (e.g., physical insertion of all or a portion of the mobile collector node into a card reader or cradle, physical coupling via a cable, etc.), for forming a transient (or temporary) communicative coupling between the mobile collector node and a sensor node.

In certain implementations, the mobile collector node is implemented within a consumer device, such as a wireless telephone, PDA, etc., and such mobile collector node utilizes the mobility of the consumer for collecting measurement data from and/or communicating information to sensor nodes 302. Of course, the mobility of the consumer is not predictable to or controlled by the wireless sensor network 301. Further, the consumer may be unaware of the locations of sensor nodes 302, and/or the consumer may be unaware that his/her mobile communication device is performing the task of collecting measurement data from and/or communicating information to sensor nodes 302.

In the example of FIG. 3, two example mobile collectors having unpredictable mobility are shown. Mobile collector $303_A$ has unpredictable mobility $304_A$ (e.g., the travel route and schedule of the mobile collector $303_A$ are unpredictable/uncontrolled by wireless sensor network 301). Mobile collector $303_B$ has unpredictable mobility $304_B$ (e.g., the travel route and schedule of the mobile collector $303_B$ are unpredictable/uncontrolled by wireless sensor network 301). At some point along their respective travel routes, mobile collectors $303_A$ and $303_B$ each come in communication range with one or more of sensor nodes 302 in this example. Of course, because their mobility is unpredictable, there may be many instances or long periods of time wherein a given mobile collector does not travel within communication range of a sensor node 302. As described further below, sensor nodes 302 may recognize (e.g., be notified by the mobile collectors) when a mobile collector $303_A$ or $303_B$ travels within communication range.

FIG. 3 shows an example in which mobile collector $303_A$ travels within communication range of a first sensor node 302 and establishes communication therewith. Mobile collector $303_A$ is capable of performing long-range communication via communication network 305 to a remote node 306, which may have an application 307 running thereon. Mobile collector $303_A$ may receive measurement data from sensor node 302 during its communication therewith. Such measurement data may comprise measurement data collected by the sensor node with which mobile collector $303_A$ is in communication and/or measurement data collected by other sensor nodes that has been received (e.g., via short-range wireless communication) by the sensor node with which mobile collector $303_A$ is communicating. Mobile collector $303_A$ may communicate the received measurement data to remote node 307 via long-range communication network 305. Additionally or alternatively, mobile collector $303_A$ may receive information from remote node 306 (e.g., from application 307) and convey that information to sensor node 302 during its communication therewith. For example, such information may be control instructions, downloadable code, alarm thresholds, setpoints, and actuator values.

As further shown in the example of FIG. 3, mobile collector $303_B$ travels within communication range of another sensor node 302 and establishes communication therewith. As with mobile collector $303_A$, mobile collector 303 B is capable of performing long-range communication via communication network 305 to remote node 306. However, in this instance, mobile collector $303_B$ may be unable to perform long-range communication at the time that it is communicating with the sensor node 302. For instance, mobile collector $303_B$ may be outside the range of long-range communication network 305. However, mobile collector $303_B$ may receive measurement data from sensor node 302 during its communication therewith. Additionally or alternatively, mobile collector $303_B$ may have previously received information from remote node 306 (e.g., from application 307) at a time when such mobile collector $303_B$ was within communication range with communication network 305, and mobile collector $303_B$ may convey that information to sensor node 302 during its communication therewith. After receiving measurement data, if any, from sensor node 302, mobile collection node 303 may later be capable of performing long-range communication, wherein it communicates any measurement data that it received from sensor node 302 to remote node 306. For instance, in the example of FIG. 3 the travel route $304_B$ of mobile collector $303_B$ eventually takes it within communication range of long-range communication network 305 at which time mobile collector $303_B$ communicates any measurement data that it received from sensor node 302 to remote node 306.

Figure 4:
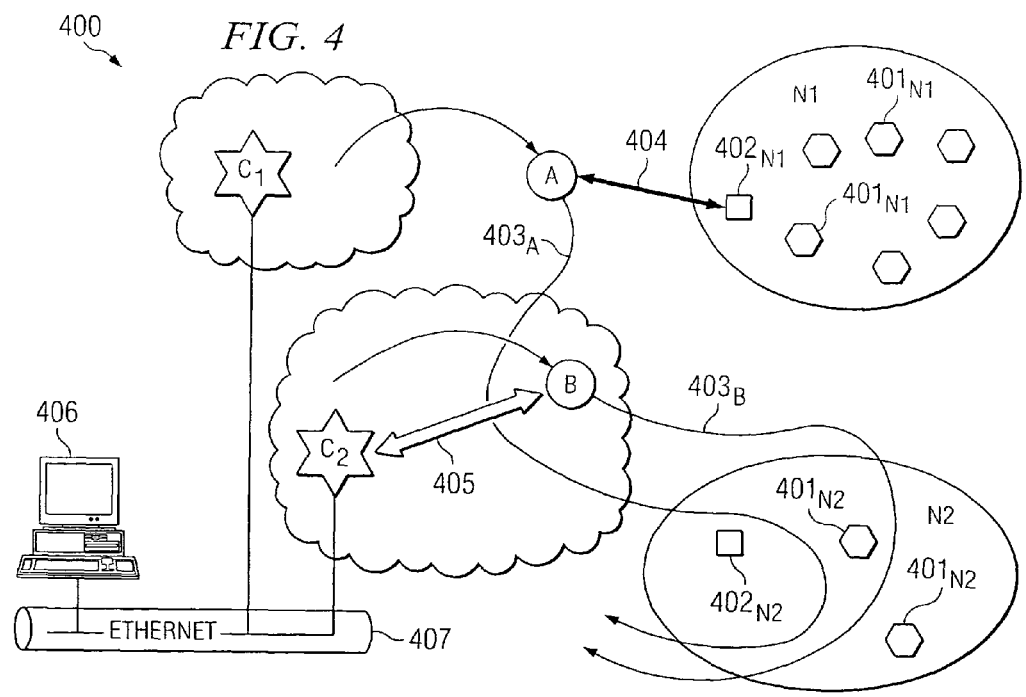
FIG. 4 shows a more specific example implementation of one embodiment of the present invention.

FIG. 4 shows a more specific example implementation of one embodiment of the present invention. The example of FIG. 4 shows a system 400 that includes two wireless sensor networks (e.g., ad-hoc sensor networks), N1 and N2. Wireless sensor network N1 contains a collection of sensor nodes (e.g., measurement devices, actuators, etc.) $401_{N1}$ (shown as hexagons) that communicate with each other via short-range wireless using any suitable protocol (e.g., any suitable ad-hoc protocol) now known or later developed. At least one device $402_{N1}$ (shown as a square) in wireless sensor network N1 is capable of interacting with a mobile collector device (e.g., a cellular telephone in this specific example) in addition to participating in the wireless sensor network.

Similarly, wireless sensor network N2 contains a collection of sensor nodes (e.g., measurement devices, actuators, etc.) $401_{N2}$ (shown as hexagons) that communicate with each other via short-range wireless using any suitable protocol (e.g., any suitable ad-hoc protocol) now known or later developed. At least one device $402_{N2}$, referred to as an "access point," (shown as a square) in wireless sensor network N2 is capable of interacting with a mobile collector device (e.g., a cellular telephone in this specific example) in addition to participating in the wireless sensor network.

In certain implementations, one or more of the individual sensor nodes $401_{N1}$ and $401_{N2}$ and/or access points $402_{N1}$ and $402_{N2}$ may be mobile such that they can move relative to each other. And, in certain implementations, sensor networks N1 and N2 may move relative to each other, including cases where they merge, split, exchange members, overlap, etc. Additionally, while one access point is shown for each of sensor networks N1 and N2 in the example of FIG. 4, in other implementations there may be multiple access points within a given sensor network. Further, sensor nodes $401_{N1}$ and $401_{N2}$ are not necessarily different from the access point nodes $402_{N1}$ and $402_{N2}$. That is, a sub-set or the entire set of nodes within a wireless sensor network may be designed to be an access point if an appropriate sensor network communication protocol is utilized.

In this example, cellular telephones A and B are implemented as mobile collector nodes that have unpredictable mobility. For instance, cellular telephone A travels unpredictable route $403_A$ and cellular telephone B travels unpredictable route $403_B$ in this specific example. Each of cellular telephones A and B may, in certain implementations, also implement a mobile sensor or actuator. Thus, those mobile collector nodes may be both a mobile sensor node and a mobile collector node. For instance, collector Node A may be implemented using an automobile, a cellular telephone, a personal digital assistant (PDA), a camera, a calculator, a free-floating buoy, watercraft, aircraft, etc. Such a combination collector and mobile sensor may, for example, include the following features: 1) the ability to communicate with other devices; 2) the availability of some computational resources to manage a measurement process, 3) access either internally or externally to a measurement device (e.g., sensor and/or actuator), and 4) the location and availability of the device at any given point in time and space may be generally known only statistically. An example of such a mobile sensor node is described further in co-pending and commonly assigned U.S. patent application Ser. No. 10/306,940 filed Nov. 27, 2002 entitled "SYSTEMS AND METHODS FOR MEASUREMENT AND/OR CONTROL USING MOBILE PROBES," the disclosure of which is hereby incorporated herein by reference. Note that any of these sensor nets, 301, N1 and N2 may, in certain implementations, consist of a single node that may measure (or sense) data about their respective environments without necessarily being in communication range of any other sensor nodes.

Although cellular telephones are used as mobile collector nodes in the example of FIG. 4, cellular telephones are only one example of devices that may be used as such a mobile collector node. Thus, embodiments of the present invention are not intended to be limited to implementations having cellular telephones as mobile collector nodes, but rather any other mobile device having sufficient long-range communication capability may be employed in a similar manner. Other examples of devices that may be employed as mobile collector nodes include, but are not limited to, the following: consumer devices, such as PDAs, laptops, and other consumer devices equipped to both a) communicate with an access point of a wireless sensor network (e.g., access points $402_{N1}$ and $402_{N2}$ in FIG. 4) using, for example, technologies like Bluetooth, 802.11, or other short-range wireless communication supported by the access point and b) capable of communicating with a general (or long-range) communication infrastructure supporting a remote application server, for example via WiFi; and commercial/industrial devices likewise equipped, such as fork lifts, watch clocks carried by guards, dedicated instrumentation installed in a vehicle, etc.

Also included in system 400 is an application server 406 that is located remote from wireless sensor networks N1 and N2 (i.e., is outside the communication range of the nodes of such wireless sensor networks N1 and N2). Application(s) may reside on server 406, and server 406 is implemented to communicate with the cellular telephone infrastructure via, for example, the Internet as shown. For instance, cellular telephones A and B communicate in the normal fashion to cell towers (or other access points into the infrastructure), such as cellular access points C1 and C2 in FIG. 4. Application server 406 is communicatively coupled to the cellular telephone infrastructure via, for example, an Ethernet connection (or other suitable connection) to the Internet (or other network) 407. Although only a single application server is illustrated in the example of FIG. 4, there may be multiple instances of such servers in alternative implementations. Further, such application servers may be running independent applications, providing redundancy, implementing a distributed application, etc.

In certain embodiments, cellular telephones A and B interact with the wireless sensor networks via a special wireless link described further below. The paths taken by the users of cellular telephones A and B are not planned by the wireless sensor networks N1 and N2 or by application server 406. Rather, as described above, the mobility of such cellular telephones is generally unpredictable (e.g., the specific route and/or the specific travel schedule of a carrier of the cellular telephone is generally unpredictable). Cellular telephones that find themselves in the vicinity of one of the sensor networks N1 and N2 will execute the appropriate interactions to provide or retrieve data. Maintaining sufficient sampling of the wireless sensor networks is dependent on the pervasiveness of cellular telephones (and/or other mobile collector devices). That is, by relying on mobile collectors having unpredictable mobility, rather than relying on a fixed mobile collector or a mobile collector with a predictable/fixed mobile (e.g., fixed travel route and schedule), collecting data from and/or communicating data to the sensor networks becomes a statistical probability (based at least in part on the pervasiveness of the mobile collectors deployed) rather than a fixed certainty. While it is unlikely that a cellular telephone will make contact with all wireless sensor networks that may be of interest (e.g., as shown in FIG. 4, cellular telephone B does not travel near the vicinity of wireless sensor network N1), by deploying sufficient cellular telephones as mobile collectors, there is a reasonable probability that some cellular telephone will make contact with at least one wireless sensor network that is of interest (e.g., that is of interest to application(s) on server 406).

In certain implementations, some form of order in the interactions between the mobile collector and access points may be induced. The mobile collectors may be selected to increase the probability of interaction with the sensor network, e.g. increase the probability density of spatial coverage. For example, cellular telephones to be used as mobile collectors may be placed under the control of individuals whose activities (e.g., travel habits) are favorable to the data collection process but not necessarily sufficiently predictable in time or space to enable normal scatter net techniques. For instance, such cellular telephones implementing a mobile collector may be carried by utility personnel, UPS trucks, police cars, etc. In all of these cases the wireless sensor network is not aware of which carriers take a telephone or their specific travel habits (e.g., their specific routes). Also, the routes may change from day to day, etc.

Additional examples that illustrate the unpredictable mobility include, without limitation, the following:

1) providing students of a University with the mobile collectors (e.g., cellular telephones) for collecting data from sensor network(s) at a University. Students typically do not follow fixed travel routes around the campus, and even though they have class schedules, they sometimes miss class and their class schedules change each semester;
2) providing employees of companies that are located in a large metropolis (e.g., downtown Chicago or New York City) with mobile collectors for collecting data from sensor networks in or around those metropolises. While the employees regularly commute to the metropolis for their jobs, they may decide to take different routes from time to time and/or may have different work schedules from day to day, depending for instance on their workload;
3) providing taxicab drivers with mobile collectors, wherein if sufficiently populated throughout many taxicabs the collectors may provide great coverage of a city, but the specific mobility (or travel pattern) of any given cab is unpredictable to the wireless sensor network; and
4) providing golfers known to play at a course that is near the vicinity of a sensor network with a mobile collector, wherein the specific regularity and times at which each golfer plays the course is unpredictable (e.g., a golfer may play Saturday morning one week, and then play Thursday afternoon 2 months later, etc.), and the golfer's travel (even around the course) is relatively unpredictable, as the golfer's travel around the course is often heavily dependent on where he hits his ball.

Cellular telephones (and/or other mobile devices) in the hands of the general public can be used as mobile collectors, provided that the phones can accept downloads of any necessary applications and are properly equipped (e.g., for communication with an access point of a wireless sensor network). To increase the pervasiveness of the consumer devices that are used as mobile collectors, incentives may be provided to the consumers in some instances. For example, incentives such as discounts of suitably equipped cellular telephones (or other mobile devices), discount rates for leaving the cellular telephone on or placing calls at defined periods, etc. may be implemented to encourage the consumer's actions toward that desired.

In certain embodiments, the mobile collector itself may comprise (at least a portion of) the application, and thus it may not necessarily communicate received measurement data from the wireless sensor network to a remote node. For instance, a collection of such mobile collector devices that each comprise a server application may communicate with each other over a suitable link to establish a distributed version of application server 406.

Figure 5:
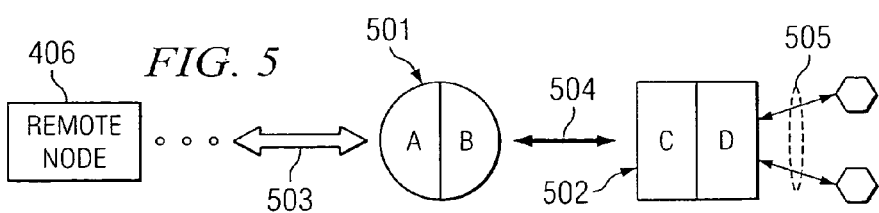
FIG. 5 shows an example communication path illustrating interfaces of a mobile collector and interfaces of an access point of a wireless sensor network in accordance with one embodiment of the present invention.

Turning to FIG. 5, the interfaces used for communication in accordance with one embodiment of the present invention are described. FIG. 5 shows a mobile collector device 501 having an interface "A" for long-range communication (e.g., via cellular link 503 in this example) and having and interface "B" for communication with an access point 502 of a wireless sensor network, such as access points $402_{N1}$ and $402_{N2}$ in the above example of FIG. 4. Access point 502 includes interface "C" for communication with mobile collector 501 via communication link 504 and interface "D" for communication with at least one other sensor node in the wireless sensor network via short-range wireless communication links 505.

The example of FIG. 5 shows communication links that may form at least a portion of the data path between an access point 502 in a wireless sensor network and a remote server 406. Although this is depicted as a continuous, stable path in FIG. 5, this is not actually the case. Table 1 below lists the approximate temporal characteristics of various portions of the communication path between a sensor node and application server 406 according to an example implementation, such as that of FIG. 4. This example implementation has extreme variation in the latency values for the various segments. This may strongly influence both the physical design of access points and the logical design of the information models and algorithms, as described further below. Of course, alternative implementations may not have as severe (or may have even more severe) latencies as those estimated for the example implementation in Table 1 below.

TABLE 1

Temporal characteristics of the communication path

| Communication Segment | Comment | Typical latency range |
|---|---|---|
| Sensor node to access point | Depends on sensor network design. | Seconds to hours |
| Access point to mobile collector | Probabilistic. | Minutes to days |
| Mobile collector to cellular tower | Depends on location. Probabilistic. | Seconds to days |

TABLE 1-continued

Temporal characteristics of the communication path

| Communication Segment | Comment | Typical latency range |
|---|---|---|
| Cell tower to server | Depends on Internet characteristics | Milliseconds |

As shown in Table 1, for the example implementation of FIG. 4, the typical latency for communication between a sensor node (e.g., sensor node $401_{N1}$ of wireless sensor network N1) and an access point (e.g., access point $402_{N1}$ of wireless sensor network N1) is seconds to hours, depending on the sensor network design (e.g., depending on its established configuration). As also shown, the typical latency for communication between an access point and a mobile collector (e.g., cellular telephone in the example of FIG. 4) is minutes to days. Of course, this access is probabilistic in nature, and thus the latency may decrease depending on the pervasiveness of the mobile collectors deployed and/or the selection of carriers to which the mobile collectors are deployed. Further, the latency for this communication may be highly variable. For instance, cellular telephone carriers may regularly come in contact with a wireless sensor network in a metropolis during the day (or during certain portions of the day, such as rush hour, etc.), and may come in contact with the wireless sensor network less frequently during the evening hours. Thus, the times at which transient communication links between mobile collectors and sensor nodes may vary and may be unpredictable to the wireless sensor network.

As further shown in Table 1, the typical latency for communication between the mobile collector (e.g., cellular telephone) in the example of FIG. 4 and a cellular tower (e.g., cellular tower C1 or C2) is seconds to days depending on location and infrastructure of the cellular network. Also, the typical latency for communication between the cellular tower (e.g., cellular tower C1 or C2) and remote server 406 is milliseconds, depending on characteristics of the Internet.

Consider a sensor node $401_{N1}$ (within the wireless sensor network N1 of the example of FIG. 4) that is located at a point $p_1$ and observing a measurement value $m_1$, at time $t_1$. Within wireless sensor network N1, this information is propagated to the access point device $402_{N1}$ located at point $p_2$ according to the network technology (e.g., according to the network communication protocol implemented). In general, the information triplet $(m_1, p_1, t_1)$ will arrive at the access device located at point $p_2$ at some later time $t_2$. The design of the sensor components and the particular network protocols (e.g., ad-hoc network protocols) in use determines how the space and time stamps $p_1$ and $t_1$ are assigned. Various example alternatives that may be used are described below.

According to one protocol that may be used, if the sensor node's clock is synchronized to the clock in access point $402_{N1}$ via a suitable network protocol (e.g., ad-hoc network protocol), then $t_1$ may be assigned at the sensor node. Alternatively, the access point $402_{N1}$ may assign $t_1$ on receipt perhaps also assigning a correction and/or uncertainty depending on its knowledge of the network topology and dimensionality. In either case, $t_1$ is relative to the clock epoch of the access point $402_{N1}$. Another alternative is for the sensor nodes themselves or the access points to be synchronized to an external (i.e., external to the wireless sensor network) source of time, such as in the global positioning system ("GPS"). In this case, $t_1$ will be relative to the external clock source. For most wireless sensor networks, however, this latter alternative will be precluded by limitations on power consumption in the sensor nodes.

A similar situation applies to the space stamp $p_1$. It is possible, but unlikely given probable power constraints, that the sensor node in wireless sensor network N1 can obtain its location from a system, such as via GPS. Depending on how the wireless sensor network N1 was configured, a given device (or "node") may know its position via explicit assignment during configuration. More likely, a suitable ad hoc protocol may allow either the access point or the individual devices to learn their relative spatial positions. In either case, the access point will be able to obtain or assign an absolute space stamp or one relative to its own location for $p_1$. At a minimum, the access point can typically estimate the spatial uncertainty in the location of a given sensor node relative to the access point from the wireless range limitations of the nodes and logical distance of the communication path. Likewise, the access point itself may or may not be able to obtain an absolute value for $p_2$ either from configuration, or access to GPS or similar system. It should be noted that embodiments described herein do not require that the spatial geometry of the wireless sensor network (e.g., which may be an ad-hoc network) be fixed in time either relative to each other or absolutely. Because the nodes may be moving, it is entirely possible that the $\{p_i\}$ are different for each corresponding $\{t_i\}$ where "i" is an index on measurement instances.

Conceptually, the collection of a set of measurements $\{(m_i, p_i, t_i)\}$ and the possible assignment of space and time stamps and their uncertainties occurs on the "D" side (or interface) of access point 502 illustrated in FIG. 5. In certain embodiments of the present invention, such as in the example implementation of FIG. 4, the communication latency between a sensor node and the application server 406 may generally be highly variable because there is a high probability that the path differs for different $t_i$, e.g. different mobile collector devices (e.g., cellular telephones) may be involved. Further, depending on the mobility (e.g., routes and travel schedules) of various different mobile collector devices, and the same data may be collected multiple times from a wireless sensor network's access point by the same or by different mobile collector devices in certain implementations. For this reason, the "D" side (or interface) of access point 502 in the example of FIG. 5 assembles the set of measurements $\{(m_i, p_i, t_i)\}$ such that the following information is unambiguous and explicit for each measurement:

(a) the representation of the measurement values $\{m_i\}$. This may include the values, an interpretable specification of the way the values are represented in terms of storage types, and units of measurement;

(b) the temporal partial ordering of the measurements, i.e. the $\{t_i\}$. For many applications, and especially when multiple wireless sensor networks are involved, the ability to total order is often desired, a property well understood by those skilled in the art of measurement science. This total order may be accomplished by the use of absolute timestamps or timestamps relative to a clock in the access point device for each wireless sensor network;

(c) similar characteristics exist for spatial specification, the $\{p_i\}$. At a minimum, relative spatial geometry with respect to the access point should be provided. If multiple sensor networks are involved, a technique may also be employed to disambiguate the spatial position of the access point(s) of each sensor network. An absolute reference such as GPS is ideal, but as discussed further below disambiguating the spatial position may also be accomplished in some cases via interaction with the mobile collector devices;

(d) for most systems it will be desirable to at least provide an estimate of the uncertainty for space and time stamps to allow reasonable ordering and comparison at the application server. In general, uncertainty will be highly useful for value attributes as well since calibration issues of multiple sensors or of a single sensor over time may arise when the devices are used in wireless sensor networks;

(e) names of various sorts may be useful for one or more of the following functions:

i) names are sometimes used in lieu of spatial information. For instance, when the position of a device is known, then spatial information about the device can be determined by merely receiving a name corresponding to the device. This may be possible in designed static systems but probably not for any but the most trivial single ad hoc network systems;

ii) names are sometimes used in lieu of or to disambiguate measurement units and/or representation information. In a trivial or statically designed system, 'units' or storage type may be understood via a name, but in some systems this is not manageable due to complexity. There are situations where the name may be used to disambiguate two measurements nominally at the same location (within the uncertainty of the $p_i$) and with the same units. For example, a single sensor node floating in a body of water may measure both water and air temperature. In this example the units would be the same and the spatial location nominally the same, thus making use of a name or equivalent to disambiguate the reported measurements desirable;

iii) in general, a name is desired for ad-hoc network(s) because there can be no guarantee that two networks can be disambiguated from position or other attributes. For example, multiple ad-hoc networks may overlap or the positional uncertainty of the networks may be too great to permit unambiguous separation based on spatial coordinates; and f) identity of individual nodes (e.g., sensor nodes, access points, etc.) of a wireless sensor network may be desired to correctly associate a node with a specific network (particularly for ad-hoc networks). For instance, depending on the specific wireless sensor network implementations, there may be no guarantee that: i) a specific node will always be in the same network, ii) it will be in any network, iii) it is not participating in multiple networks at the same time, and iv) the situation is static. Identity information provides a way to logically resolve these alternatives. Because ad-hoc sensor networks communicate by short-range wireless, minor differences like changes in spatial location, signal strength, etc. can change the membership of a specific node with respect to multiple networks. Universally unique identifiers ("UUID") are one example implementation for uniquely identifying nodes.

To achieve the above points, a standardized, uniform data model for access to the wireless sensor networks may be employed for the interface "D" of access point 502, for example. A uniform data model is a defined system-wide specification of what data elements are present. An example of such a data model may be found in the standards IEEE 1451.1 and IEEE 1451.2.

As shown in FIG. 5, access point 502 includes an interface "D" for communicating with sensor nodes within a wireless sensor network and an interface "C" for communicating with a mobile collector 501. Therefore, the two sides (interfaces) of access point 502 support rather different communication protocols. Because of the unpredictable mobility of mobile collector 501, various issues arise that are considerably different than for interaction with a fixed infrastructure (in which the mobile collector is stationary or is predictably present at a certain location), some of which are discussed further below.

One issue arises because the time behavior of the "C" and "D" sides (interfaces) of access point 502 may be completely different. The "D" side operates on the time scale, sampling specifications, etc. of its wireless sensor network. The "C" side operates on the time scale, sampling specifications, etc. for a communication protocol used for communicating with mobile collector 501. The "C" side is highly probabilistic in that communication depends on the somewhat random appearance of one or more mobile collectors 501 (e.g., cellular telephones in the example of FIG. 4) forming a transient communication link (e.g., coming within communication range) with access point 502. As a consequence, the access point device 502 should be prepared to cache information from the wireless sensor network until the "C" side establishes communication. In general, this caching will preferably span multiple acquisitions of measurement data from the sensors of the wireless sensor network, which is yet another reason for implementing the above-described data model (e.g., to resolve ambiguities). Access point 502 may further implement a data discard or reduction policy due to memory limitations aggravated by this caching feature. Of course, in certain implementations in which capture of all (or substantially all) of the measurement data is not necessary, the latest measurement information collected by sensors at the time of communication between access point 502 and mobile collector device 501 may be used, in which case, access point 502 may not need a cache for storing more than the latest information (or the access point 502 may not pre-store information from the sensors but may instead poll the sensors after recognizing that a mobile collector is sufficiently close for communication, and upon receiving the data from the sensors may relay it on to the mobile collector).

Another issue arises because, in many implementations, it is quite likely that more than a single mobile collector 501 accesses the access point 502 within a time frame compatible with maintaining a cache in access point 502. This allows duplicate messages to be sent and received between the access point 502 and different mobile collectors 501. For sending information to the application server 406, multiple messages will increase the reliability and performance of the system since the length of time for any given mobile collector 501 to deliver the message may vary or the attempt may fail. Duplicates, to be resolved by the destination, can thus help with timely receipt of measurement information at the remote node 406. Again, the inclusion of UUIDs, as well as time and space stamps may be used for this type of implementation to avoid/resolve ambiguities between the same message being received multiple times at remote server 406. In the case of the access point 502 receiving information, this can appear as duplicate messages from multiple different mobile collectors 501 at widely spaced times. For instance, a various different mobile collectors 501 may possess a message (e.g., from remote node 406) to be provided to the wireless sensor network, and over a period of time multiple ones of the mobile collectors may deliver the message to access point 502, wherein the access point 502 resolves these messages (e.g., again using UUIDs, etc). Of course, upon a first mobile collector communicating the message to access point 502, such mobile collector may report this communication to remote node 406 which may in turn instruct the other mobile collectors with which it can communicate to ignore the earlier request to provide the message to such access point 502. Although, there may be instances in which remote node 406 is unable to communicate the instruction to ignore the earlier request to a mobile collector before it also communicates the message to access point 502, in which case access point 502 should be able to resolve the duplicate messages in some manner.

Another issue arises because, as noted above, the absolute location $p_2$ of the access point 502 is desired for most applications. GPS will often be too expensive, either in monetary cost or energy, to determine the location $p_2$. However, many types of mobile collector devices 501 (such as cellular telephones) may know their absolute position to reasonable accuracy, either via GPS or via interaction with their respective communication infrastructure. Since the characteristics of the wireless link between the mobile device 501 and the access points 502 are known, the position of the access point 502 relative to the absolute position of the mobile device 501 can be estimated to be within a region (e.g., circle) of the mobile collector's location defined by the uncertainty of the mobile collector location and the link characteristics. This information could be bundled with the information sent to the remote node 406 for resolution at the application level. The remote node may use such location information received from various different mobile collectors at their times of communication with the access point 502 for more accurately determining the position $p_2$. It may also be attractive for the "C" interface of the access point 502 to keep statistics on these determinations of its location over interactions with multiple mobile collectors 501. This allows more accurate determination of the location over time for fixed locations or some calibration of movement for moving, ad-hoc networks.

Where the location statistics are maintained in the access point 502, they may be used to resolve relative spatial values, $p_i$, for each measurement before reporting. There are, of course, two components to the two-dimensional (2D) spatial orientation of an ad-hoc network, translation and rotation. If there is only a single access point 502 then only the translational value can be determined absent absolute references from the sensor nodes. If there are two access points 502, both of which build up increasingly accurate absolute determination of their locations as a result of interactions with the mobile collectors 501, then the rotational component can also be estimated. This can be done via the exchange of such information within the ad-hoc network or simply passed up to the application layer (e.g., of remote server 406) to resolve. The accuracy in determining the rotational component will depend on the uncertainties in the access point location data and on the distance between the cooperating access points relative to the scale of the ad-hoc network.

As also noted above, an issue arises because the absolute time scale of the access point 502 is often desired for applications. GPS will often be too expensive, either in monetary cost or energy, for use in determining a time scale. However, many types of mobile collector devices 501 (e.g., cellular telephones) will know their absolute time with reasonable accuracy, either via GPS or via interaction with their respective communication infrastructure. This information may be communicated to the access point 502, thus allowing the access point to convert any relative times $t_i$ in the measurement data to absolute times. As in the spatial case, the access point 502 can maintain statistics on successive 'resynchronizations' resulting from multiple interactions with multiple different mobile collectors 501, thus allowing the internal clock of the access point 502 to be synchronized to the external time base of a mobile collector's communication infrastructure (e.g., the cellular communication infrastructure). Also as in the spatial case, if there are multiple access points within an ad-hoc network, this information can be shared to improve the overall synchronization within such ad-hoc network.

The physical design of the "C" interface of access point 502 is capable of communicating with a mobile collector 501 via a suitable communication protocol. Such short-range wireless communication protocols as Bluetooth, 802.11, etc., may be used, for example. Various other suitable communication protocols for transient communication between mobile collector 501 and access point 502 may be used in alternative embodiments. For instance, physical coupling between mobile collector 501 and access point 502 may occur (e.g., via cable, insertion into a cradle, etc.) and provide a transient communication link therebetween. For instance, carriers of mobile collector 501 may receive incentives (e.g., free minutes of call time on their cellular telephone, etc.) to form a physical coupling between their respective mobile collector 501 and access point 502 when they are in the vicinity thereof. The large disparity between the access timing between a) the mobile collector 501 and access point 502 and b) the activities in the access point 502 (e.g., the collection of measurement data by sensor nodes in the wireless sensor network) raises issues that are addressed further below.

In particular, the access point 502 is likely to have power source (usually battery) limitations that preclude simply being 'always on' waiting for contact with a mobile collector 501. On the wireless sensor network side of access point 502, this problem can be managed by scheduling wakeup in the wireless links, for example. On the mobile collector side of access point 502, this is not possible due to the probabilistic, and unfortunately, potentially long gaps between accesses. One way to resolve this problem is to have a very low-power or a passive wakeup link between the mobile collector 501 and the "C" side of the access device 502, such as the example radio frequency identification ("RFID") technique described further below.

Passive RFID technology may be applicable for establishing communication between a mobile collector 501 and access point 502, and in some circumstances might constitute the entire link, at least in the direction from mobile collector 501 to access point 501. An RFID sensor could s be considered a degenerate manifestation of the ad-hoc network architecture described herein. A slight variation on the usual mode of RFID technology may also be appropriate. Normally, the active RFID reader directs energy to the passive device that then encodes a response (the ID) and returns it back to the reader making use of energy scavenged from the query. In the present application, an additional function would be to turn on the receiver/transmitter of the access point 502 for a higher capacity channel (e.g., Bluetooth, etc.) to communicate cached data therefrom to the mobile collector 501.

In some cases it may be desirable to encode information from the mobile collector 501 (the active end of the RFID link) for delivery to the passive RFID detector in the access point 502. The information would preferably be encoded near the end of the RF transmission to allow sufficient energy to be scavenged by the mobile collector 501 to allow decoding of the encoded information by the mobile collector. This use of RFID technology permits selective wake-up or other functions to be performed based, for example, on the encoding.

As shown in the example of FIG. 5, the mobile collector 501 may comprise one interface "B" for communicating with access point 502 via a transient communication link (e.g., short-range wireless communication, temporary physical coupling, etc.) 504, and another interface "A" for communicating via long-range communication 503, such as cellular communication, with remote node 406. Thus, whether the mobile collector 501 is a cellular telephone, a PDA, etc., it will, in addition to its normal communication links into the regular communication infrastructure (e.g., the cellular infrastructure for a cellular telephone) physically and logically support communications to the access points 502. Physically, this implies that the "B" side of these mobile collector devices 501 support the appropriate transient link technology selected, such as Bluetooth, 802.1.1., RFID, etc.

Logically, in addition to supporting the information models and communications discussed earlier, the "B" side may, in certain implementations, have the ability to cache information directed to access points 502 until contact is made with one or more of such access points 502. Further, the "B" interface may, in certain implementations, be capable of caching information received from access points 502 until it is capable of making long-range communication of such information to remote server 406 (e.g., until contact is made by a cellular telephone with a cell tower as in the example of FIG. 4). Again, the time scales seen on the "A" and "B" sides of the mobile collector 501 differ, and in many implementations simultaneous contact will be the exception. For many applications, the mobile collectors 501 will not be under control of the application (running on server 406) except in the sense that the mobile collectors 501 may contain some application for collecting data from the wireless sensor nodes. Therefore, any application specific or wireless sensor network specific information should be communicated understanding the statistical nature of the link in which neither the time of communication (either to the mobile collector 501 or to the wireless sensor network) nor the specific mobile collector(s) that will ultimate perform the desired communication are pre-known.

Turning to FIG. 6, an operational flow of one example embodiment of the present invention is shown. In operational block 601, sensor nodes are distributed (either in an ad-hoc manner or through precise placement) to form a wireless sensor network. As mentioned above, in certain implementations some or all of such sensor nodes may be mobile nodes (e.g., cellular telephones). In operational block 602, at least one mobile collector is deployed that has mobility that is unpredictable to the wireless sensor network. Such mobile collector is used for performing at least one of the following: 1) collecting data from at least one node of the wireless sensor network, and 2) communicating data to at least one node of the wireless sensor network. As shown in the example blocks 602$_A$-602$_C$ of FIG. 6, using the mobile collector in this manner may, in certain implementations, involve determining (in block 602$_A$) whether the mobile collector is in communication range of a node of the wireless sensor network. For instance, the mobile collector may detect when it is in communication range of such a node by prior knowledge of locale, by beacon or hearing sensor network traffic, by polling or RF-ID wakeup signal producing a positive result, by time or by other event or condition. If determined that it is in communication range of a node, the mobile collector may send a "wake-up" signal (e.g., using RFID technology) to the node of the wireless sensor network (in operational block 602$_B$). Operations 602$_A$ and 602$_B$ may be merged into one operation if the wake-up signal is used to detect the presence of the sensor network. Then, the mobile collector may receive data from and/or communicate data to the node of the wireless sensor network (in operational block 602$_C$).

In operational block 603, a determination is made whether the mobile collector is in communication range with a remote node. If so, then in operational block 604 the mobile collector may communicate (e.g., via long-range communication) data received from the node of the wireless sensor network to the remote node and/or receive data from the remote node that is to be communicated to a node of the wireless sensor network. It should be understood that while the example flow of FIG. 6 is shown as a linear flow, such linear flow is not necessary and may not be truly representative of many actual implementations in that many of these actions may occur in parallel particularly when the mobile collector makes simultaneous contact with multiple sensors. For example, due to the unpredictable nature of the mobility of a mobile collector deployed, the determinations of blocks 602$_A$ and 603 regarding whether the mobile collector is in communication range of a sensor node or a remote node may be ongoing determinations being continually monitored in parallel.

Turning now to FIG. 7, an operational flow of another example embodiment of the present invention is shown. As shown, sensor nodes are distributed in a wireless sensor network in operational block 701. In block 702, a plurality of mobile collectors are deployed. In block 703, the mobile collectors are used to perform data communication to/from at least one node of the wireless sensor network, wherein the data communication relies on statistical probability that at least one of the mobile collectors will travel in communication range of the at least one node for communicating therewith in a desired manner. That is, by implementing a pool of mobile collectors that appear to the wireless sensor network to travel in a substantially random, disorganized, chaotic, or entropic manner, and wherein any of the mobile collectors in the pool may be used for accessing the wireless sensor network, reliance is placed on a statistical probability that given a sufficiently large, mobile pool of mobile collectors, ones of those collectors will encounter the wireless sensor network sufficiently regularly to support a desired application.

As mentioned above, nodes of a wireless sensor network typically have limitations on their available energy. Further, many mobile collector devices that may be used, such as cellular telephones, may also have limitations on energy storage that may constrain the design of this architecture. Wireless sensor networks are typically designed to operate for long periods of time on small batteries, thus severely limiting communication capability and to a lesser extent computation. Many mobile devices, such as cellular telephones may be expected to operate for hours between opportunities for recharging their batteries.

As discussed further below, there are application spaces enabled by the use of certain mobile collector devices, such as cellular telephones, that suggest optimizing the wireless sensor networks not for long periods of low activity, but for short periods of moderate activity separated by long periods of inactivity. It should be noted that "short" and "long" in this sense are relative to the energy usage patterns, and do not necessarily translate into short being seconds and long being days for instance. For such a niche, energy scavenging technology becomes quite attractive as the power source for the nodes in the wireless sensor network. Thus, while a node in the wireless sensor network scavenging some amount of energy from its environment (e.g., vibration energy, solar energy, etc.) might not be sufficient for the node to support measurements and communication of the measurement data for 100 milliseconds every 10 minutes, it might work perfectly well for several seconds worth of operation every week, for example.

Unlike conventional measurement architectures, certain implementations of an architecture that uses a mobile data collector having mobility that is unpredictable to the wireless sensor network may raise certain demands an the application server (406) design. The server 406 and/or the application running thereon for the wireless sensor network (s) should take into account the statistical nature of timing of the communication channel. In particular, it should be prepared to deal with: a) receipt of multiple/duplicative data, as well as missing data in communication from sensors and delivery to the sensors, b) no control over the communication latency, c) uncertainty in topology of individual and collections of the wireless sensor networks, and d) uncertainty in most parameters of measurement (value, time, place). This places a premium on accurate time stamps for data, events, requests, etc., and the use of time of execution specifications rather than time of receipt specifications. In addition, applications may be examined to determine the effect of latency on the ability to actually carry out various algorithms, procedures, etc. In general, applications should be distributed such that critical timing or logical operations operate at a point in the system minimizing the effects of the latency. Most often this will mean distributing the applications (or at least those time-sensitive operations thereof) in the mobile collectors 501, access points 502, and/or the sensor nodes of the wireless sensor network.

As a starting point for looking at potential applications, it is helpful to consider some design trade-off parameters and identify where embodiments of the present invention may be desirably applicable. One parameter that may be considered is the loop or reaction time of an implementation. An application desiring to interact with a wireless sensor network via an unpredictable mobile collector may have a characteristic time or natural operating frequency. For closed-loop servo control, for example, this characteristic time is often measured in milliseconds. For monitoring, this time is typically minutes to days between the measurement and resulting actions. The probabilistic nature of the mobile collector 501 to the wireless sensor communication link 504 will usually preclude reaction times shorter than hours or days. However, there are circumstances where very short times are possible corresponding to a very high probability of a mobile collector 501 being present, for example during a ball game, rush hour, during business operation, etc. The wireless sensor networks can support reaction times from very short (e.g., milliseconds), to very long depending mostly on the available power at each node.

Another parameter that may be considered is frequency of access. This is a measure of how often the wireless sensor network is desired to be sampled by the application. This can range over once, on-demand, periodic, and continuous, as examples. Most work on wireless sensor networks to date has focused on periodic sampling. Continuous operation is generally precluded due to energy limitations of the sensor nodes, as described above. The use of mobile collector devices may be utilized for on-demand operation due to the low to moderate probability of a mobile collector 501 being near an access point 502 at or near a desired time at which a "demand" for sampling is made. When particularly dense mobile collector populations are implemented, continuous or periodic sampling may be reliably used.

Another parameter that may be considered is duration of operation. This is a measure of how long the application is to be sustained, regardless of the frequency of access of a wireless sensor network. For example many conventional laboratory applications are utilized for a few days before being torn apart for other purposes. On the other hand, a factory monitoring system may be in place for years. In this architecture, the power supply to the wireless sensor network is the most sensitive design issue with respect to duration of the operation. Operation longer than the energy storage of appropriate batteries, probably a maximum of a few years with optimal design, requires permanent power connection or the use of some energy scavenging technology.

Another parameter that may be considered is shelf life. The case where the frequency of access of the wireless sensor network is very rare, perhaps separated by years, may greatly affect the design of the wireless sensor network, and perhaps the server applications as well. At the wireless sensor network, the power issue is the most difficult. Batteries have a finite shelf life even with no drain. Scavenging technology and passive RFID-like technologies may be employed to prolong shelf life.

Another parameter that may be considered is installation cost measures. One installation cost measure is spatial extent/density, which is a measure of the required density and the extent of coverage required by the application. Many mobile collectors, such as cellular telephones, pose no limitation because of the wide distribution of such devices in the population although their location patterns might. Sensor nodes of wireless sensor networks using batteries are usually spaced a few meters apart over a region of 10 s to 100 s of meters. Another installation cost measure is the leaf node cost. Traditional measurement instruments are expensive, Supervisory Control And Data Acquisition nodes are less expensive, and typical factory distributed sensors are still less expensive on average. The sensor nodes receiving most of the attention for many applications in place today have target prices of cents to allow massive and widespread spatial coverage and density without undo cost. Another installation cost measure is deployment cost. Traditional measurement systems are typically high cost. Wireless sensor networks requiring wired power, access to the Internet, etc. tend to increase the deployment cost. The use of mobile collectors (e.g., cellular telephones) opens up the possibility of short-term, quick, inexpensive installation assuming the power requirements for the nodes can be met by batteries, scavenging, etc.

In view of the above measures, certain applications that may be particularly suitable for utilizing such an unpredictable mobile collector technique are described further below. Of course, embodiments of the present invention are not intended to be limited in application to those examples provided herein below. One type of application that may be suitable is an episodic, short-term application. These applications are characterized by requirements for quick, easy installation with no design time, guaranteed presence of mobile collectors (e.g., cellular telephones), short application lifetime and measurements compatible with wireless sensor network density and scale. Typically, battery power is not an issue due to the short times. Emergency situations such as toxic spill monitoring, fire control, many military battlefield operations, and highly crowded events (e.g., "woodstock") are situations in which such an application may be of great utility. The economic value comes in rapid installation, and the timeliness, coverage and possibly low cost of measurements. In these situations, the cost of the measurement system may be paid for by enabling better control of the situation, safety, etc. (e.g., by reducing after-the-fact damage costs). The use of mobile collectors, such as cellular telephones, allows access to larger information systems, as well as reducing the cost of linking the wireless sensor networks to proper applications managing/responding to the situation.

Another type of potential applications are medium-term, periodic, loose latency applications. These applications are characterized by sampling rates, coverage, etc. compatible with battery or scavenged power for nodes and loose requirements of the latency for delivering information. If the mobile collector access probability patterns match the application, these can be quite interesting, especially in cases where the mobile collector access to the wireless sensor network is separated in time from the delivery to the remote node (e.g., via a cellular or other long-range communication infrastructure). Agriculture monitors where the nodes need last only for a crop season, medium-term environmental and other monitoring such as beaches during the summer are examples in which this type of application may find utility. Many factory and similar installations where there is extensive rebuilding every year due to model changes, etc. may also be suitable for such application.

Another type of applications that may be considered are long shelf life, episodic, short-duration applications. Pre-installed wireless sensor networks powered by scavengers may be used, for example. The networks are rarely sampled but have high value when needed. Emergency response situations where, for example, wireless sensor networks pre-installed in buildings are activated only during an emergency is a potential application of this type. The low cost and freedom from wiring allow this to be installed economically and could provide temperature, occupancy, structural strain, ingress-egress route information, etc. to emergency personnel.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method comprising:
   using at least one mobile data collector, having mobility that is unpredictable to a wireless sensor network, for performing at least one of data collection from and data communication to at least one sensor in said wireless sensor network, wherein said mobility that is unpredictable to said wireless sensor network comprises a travel schedule of said at least one mobile data collector that is unpredictable to said wireless sensor network.

2. The method of claim 1 further comprising:
   deploying a plurality of said mobile data collectors, each having mobility that is unpredictable to the wireless sensor network.

3. The method of claim 1 further comprising:
   distributing sensors, including said at least one sensor, in the wireless sensor network, wherein the sensors are operable to capture measurement data for a feature of interest.

4. The method of claim 1 wherein said at least one sensor is operable to perform at least one of the following: capture measurement data for a feature of interest, sensing, actuation, computation, data storage, and forwarding data.

5. The method of claim 1 wherein said mobile data collector comprises a general-purpose mobile communication device.

6. The method of claim 1 wherein said mobile data collector comprises one selected from the group consisting of: cellular telephone, personal digital assistant (PDA), laptop computer, pager, and a wireless communication device in a vehicle.

7. The method of claim 1 wherein said at least one mobile data collector forms transient communication links with said at least one sensor.

8. The method of claim 7 wherein times at which said transient communication links are formed are unpredictable to the wireless sensor network.

9. A method comprising:
   using at least one mobile data collector, having mobility that is unpredictable to a wireless sensor network, for performing at least one of data collection from and data communication to at least one sensor in said wireless sensor network;
   deploying a plurality of said mobile data collectors, each having mobility that is unpredictable to the wireless sensor network; and
   said mobility of said plurality of mobile data collectors resulting in a pattern of accesses of said at least one sensor in said wireless sensor network by ones of said plurality of mobile data collector that is unpredictable to said wireless sensor network.

10. A method comprising:
    using at least one mobile data collector, having mobility that is unpredictable to a wireless sensor network, for performing at least one of data collection from and data communication to at least one sensor in said wireless sensor network, wherein said mobility that is unpredictable to said wireless sensor network comprises a travel route of said at least one mobile data collector that is unpredictable to said wireless sensor network.

11. A method comprising:
    using at least one mobile data collector, having mobility that is unpredictable to a wireless sensor network, for performing at least one of data collection from and data communication to at least one sensor in said wireless sensor network;
    said at least one mobile data collector determining if it is in range for wireless communication with said at least one sensor; and
    if determined that said at least one mobile data collector is in range for wireless communication with said at least one sensor, said at least one mobile data collector communicating a wake-up signal to said at least one sensor to cause it increase its power to level suitable for communication.

12. A method comprising:
using at least one mobile data collector, having mobility that is unpredictable to a wireless sensor network, for performing at least one of data collection from and data communication to at least one sensor in said wireless sensor network; and
during a transient communication with said at least one mobile data collector, said at least one sensor communicating data with at least one of (a) timestamp information and (b) spatial location information.

13. The method of claim 12 wherein the timestamp information provides a relational time reference for the data.

14. The method of claim 13 wherein the timestamp information identifies when the data was captured by a sensor of said wireless sensor network.

15. The method of claim 12 wherein the spatial location information provides a relational spatial position reference of a sensor of said wireless sensor network that captured the data at the time of its capturing the data.

16. A method comprising:
deploying a plurality of mobile collectors that are each operable to communicatively access a node of a wireless sensor network and that are each independently movable; and
employing an application that desires communication access with at least one node of the wireless sensor network, wherein said application relies on statistical probability that at least one of the plurality of mobile collectors will travel in communication range of the at least one node of the wireless sensor network for performing the desired communication.

17. The method of claim 16 wherein said application is a distributed application.

18. The method of claim 17 wherein said application is at least partially distributed among said plurality of mobile collectors.

19. The method of claim 16 wherein mobility of said plurality of mobile collectors is unpredictable to said application.

20. The method of claim 16 wherein a pattern of access of said at least one node of the wireless sensor network by said plurality of mobile collectors is not predefined for said application.

21. The method of claim 16 wherein a pattern of access of said at least one node of the wireless sensor network by said plurality of mobile collectors is not predictable to said application.

22. The method of claim 16 wherein said desired communication comprises at least one of a) collecting data from said at least one node of the wireless sensor network and b) communicating data to said at least one node of the wireless sensor network.

23. The method of claim 16 wherein said desired communication comprises periodic communication access with said at least one node of the wireless sensor network.

24. The method of claim 23 wherein said periodic communication access is desired to have a latency between accesses of the at least one node of no more than a threshold period.

25. The method of claim 16 wherein the application is operable to calibrate data received from the plurality of mobile collectors.

26. The method of claim 25 wherein calibrating data comprises resolving conflicts between data received from the plurality of mobile collectors.

27. The method of claim 25 wherein calibrating data comprises organizing data received from the plurality of mobile collectors.

28. The method of claim 25 wherein when any one of said plurality of mobile collectors communicatively access said at least one node of the wireless sensor network, said at least one node of the wireless sensor network communicates data with at least one of (a) timestamp information and (b) spatial location information to said one of said plurality of mobile collectors.

29. The method of claim 28 wherein said timestamp information provides a relational time reference for the data.

30. The method of claim 29 wherein said timestamp information identifies when the data was captured by a node of the wireless sensor network.

31. The method of claim 29 wherein said spatial location information provides a relational spatial position reference of a node of the wireless sensor network that captured the data at the time of its capturing the data.

32. The method of claim 29 wherein the application bases its calibration at least in part on at least one of the timestamp information and spatial location information.

33. A system comprising:
a wireless sensor network having a plurality of nodes, wherein at least one of said plurality of nodes comprises
a) an interface for communicating via wireless communication with other nodes of said wireless sensor network and
b) an interface for communicating via a transient communication link with a mobile collector;
at least one mobile collector comprising a first interface having a first range of communication for communicating with a node in said wireless sensor network, and said at least one mobile collector comprising a second interface for communicating with a node external to said wireless sensor network wherein said second interface is operable for communicating a range longer than said first range; and
wherein said node external to said wireless sensor network relies on said at least one mobile collector for accessing said wireless sensor network for performing at least one of a) collecting data from said wireless sensor network and b) communicating data to said wireless sensor network, and wherein an access pattern of said at least one mobile collector accessing of said wireless sensor network is not predefined.

34. The system of claim 33 wherein said transient communication link is a wireless communication link.

35. The system of claim 33 wherein said interface for communicating via wireless communication with other nodes of said wireless sensor network and said interface for communicating via a transient communication link with a mobile collector are a common interface of said at least one of said plurality of nodes.

36. The system of claim 33 wherein said at least one mobile collector is implemented in a general-purpose communication device.

37. The system of claim 33 wherein said mobile collector is implemented in a cellular telephone.

38. The system of claim 33 wherein said first interface of said at least one mobile collector is operable to communicate via at least one of a) Bluetooth and b) 802.11 communication protocols.

39. The system of claim 33 wherein said second interface of said at least one mobile collector is operable to communicate via cellular communication.

40. A system comprising:
a wireless sensor network comprising a plurality of means for measuring a characteristic of an environment and communicating via short range wireless communication; and
a plurality of means for accessing at least one of the measuring means for performing a desired communication therewith, wherein said plurality of access means are independently movable and are capable of travelling outside communication range of the wireless sensor network, and wherein a statistical probability exists that at least one of the accessing means will travel within range of said at least one of the measuring means to enable the accessing means to perform the desired communication with said at least one of the measuring means.

41. The system of claim 40 wherein the accessing means are each implemented in a general-purpose communication device.

42. The system of claim 40 further comprising:
means for processing measurements made by the measuring means, wherein the processing means relies on the statistical probability for receiving measurements made by the measuring means from the accessing means.

43. The system of claim 40 further comprising:
at least one processing means that is located outside said communication range of the wireless sensor network, wherein the at least one processing means relies upon the accessing means for performing said desired communication with said at least one of the measuring means and wherein said desired communication comprises at least one of a) receiving measurement information from said at least one of the measuring means and b) communicating information to said at least one of the measuring means.

44. A method comprising:
using at least one mobile data collector for performing at least one of data collection from and data communication to at least one node of a wireless sensor network;
said at least one mobile data collector determining if it is in range for transient communication with said at least one node; and
if determined that said at least one mobile data collector is in range for transient communication with said at least one node, said at least one mobile data collector communicating a wake-up signal to said at least one node to cause it to increase its power to a level suitable for communication.

45. The method of claim 44 wherein said wake-up signal comprises a radio frequency identification (RFID) signal.

46. The method of claim 44 wherein said transient communication comprises wireless communication.

47. The method of claim 44 wherein said at least one mobile data collector has mobility that is unpredictable to the wireless sensor network.

* * * * *

UNITED STATES PATENT AND TRADEMARK OFFICE
CERTIFICATE OF CORRECTION

PATENT NO.        : 7,242,294 B2
APPLICATION NO. : 10/664400
DATED             : July 10, 2007
INVENTOR(S)      : Warrior et al.

It is certified that error appears in the above-identified patent and that said Letters Patent is hereby corrected as shown below:

On the Title page, in field (56), under "Other Publications", in column 2, line 3, delete "Taining" and insert -- Training --, therefor.

On the Title page, in field (56), under "Other Publications", in column 2, line 7, delete "Corporation ," and insert -- Corporation, --, therefor.

In column 25, line 2, in Claim 11, before "increase" insert -- to --.

In column 26, line 53, in Claim 35, before "33" insert -- claim --.

Signed and Sealed this

Fourth Day of December, 2007

JON W. DUDAS
*Director of the United States Patent and Trademark Office*